(12) United States Patent
Carpelan

(10) Patent No.: US 8,169,988 B2
(45) Date of Patent: May 1, 2012

(54) WIRELESS LOCAL AREA NETWORK

(75) Inventor: Paulus Carpelan, Helsinki (FI)

(73) Assignee: Wi-LAN, Inc., Ottawa, Ontario (CA)

( * ) Notice: Subject to any disclaimer, the term of this patent is extended or adjusted under 35 U.S.C. 154(b) by 222 days.

(21) Appl. No.: 12/474,156

(22) Filed: May 28, 2009

(65) Prior Publication Data

US 2009/0240806 A1 Sep. 24, 2009

Related U.S. Application Data

(63) Continuation of application No. 09/860,765, filed on May 21, 2001, now Pat. No. 7,554,957.

(30) Foreign Application Priority Data

May 31, 2000 (FI) ...................................... 20001311

(51) Int. Cl.
*H04W 4/00* (2009.01)

(52) U.S. Cl. .......................... 370/338; 370/230; 370/349

(58) Field of Classification Search .................. 370/230, 370/338, 349
See application file for complete search history.

(56) References Cited

U.S. PATENT DOCUMENTS

| | | | |
|---|---|---|---|
| 5,113,499 A * | 5/1992 | Ankney et al. ............... | 340/5.74 |
| 5,705,991 A | 1/1998 | Kniffin et al. | |
| 6,014,563 A | 1/2000 | Szabo | |
| 6,061,684 A | 5/2000 | Glasser et al. | |
| 6,105,100 A | 8/2000 | Dean et al. | |
| 6,158,010 A | 12/2000 | Moriconi et al. | |
| 6,331,972 B1 | 12/2001 | Harris et al. | |
| 6,412,003 B1 | 6/2002 | Melen | |
| 6,438,591 B1 | 8/2002 | Fehskens et al. | |
| 6,675,208 B1 | 1/2004 | Rai et al. | |
| 7,260,715 B1 | 8/2007 | Pasieka | |
| 2001/0054101 A1 | 12/2001 | Wilson | |
| 2008/0220775 A1 | 9/2008 | Tischer et al. | |

FOREIGN PATENT DOCUMENTS

WO 9900720 1/1999

OTHER PUBLICATIONS

Anderson, Wilhelmina "AirConnect Site Survey Administrator Guide", Version 1.0, Part No. 09-1765-0000, http://www.3com.com, Sep. 1999.

* cited by examiner

*Primary Examiner* — Jason Mattis
(74) *Attorney, Agent, or Firm* — Volpe and Koenig, P.C.

(57) ABSTRACT

A wireless network includes a base transceiver station configured to transmit signals over a wireless connection to a plurality of terminals connected to the local area network and receive signals over a wireless connection from a plurality of terminals. The new terminal is arranged to transmit a connection request message comprising an identifier and a request to identify the new terminal to the network when the new terminal tries to access the wireless network. The network is arranged to transmit information regarding one or more new terminals attempting to access the wireless network to the user through the control interface. A control interface enables a user to transmit a control command to the network to allow a new terminal to be connected to the network.

20 Claims, 2 Drawing Sheets

WIRELESS LOCAL AREA NETWORK

Figure 1:
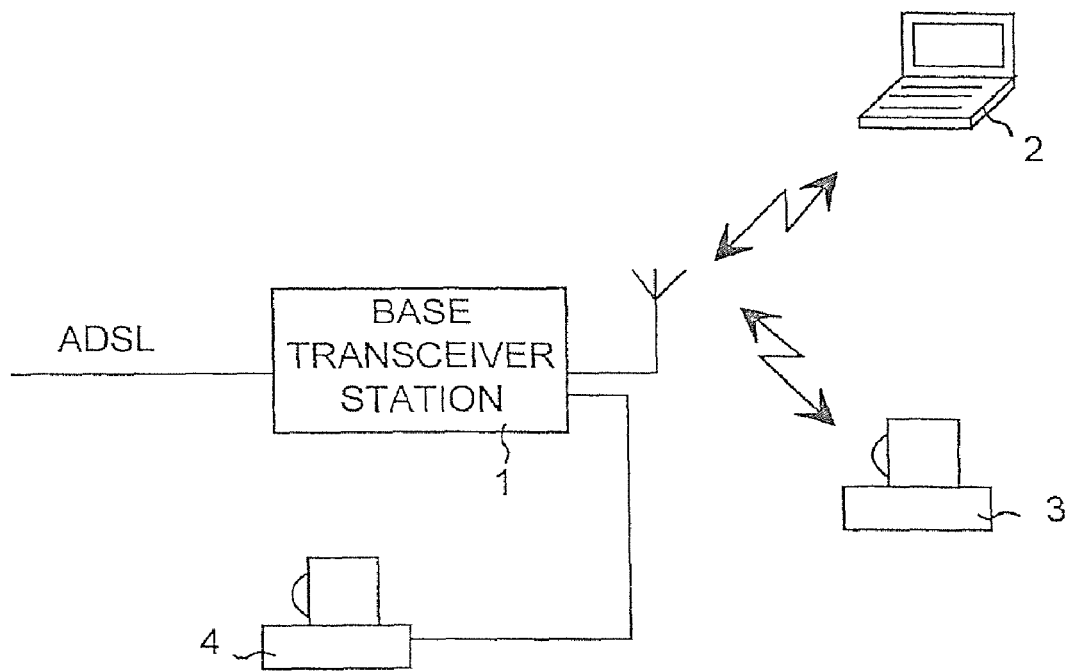

This application is a continuation of parent U.S. application Ser. No. 09/860,765 filed on May 21, 2001. The entire disclosure of the prior application is hereby incorporated by reference herein in its entirety.

The exemplary embodiments relate to a wireless local area network wherein terminals, through a base transceiver station, are able to communicate with each other and possibly with terminals connected to other telecommunication networks if the base transceiver station is connected e.g. to the Internet.

Wireless local area networks are previously known, such as wireless local area networks WLAN, wherein mobile terminals (clients) equipped with WLAN cards move around and, using radio signals, communicate with "access points". A problem associated with these known wireless local area networks is the way in which a new terminal is connected to a network. Since terminals are connected to the network through a wireless connection, in practice the wireless network necessitates an arrangement to prevent unauthorized terminals from connecting to the network. Otherwise there is a risk that e.g. an outsider standing in the street might, using a wireless terminal, access a wireless local area network of an adjacent company.

In the known wireless local area networks, the use of unauthorized devices has been prevented by only allowing terminals registered in a particular network to be used therein. If a new terminal is to be used in the network, information on the particular terminal should be registered in the network in advance so that a base transceiver station of the network would be willing to communicate with the new terminal.

In the known wireless local area networks, the registration mentioned above is implemented such that each terminal has a unique identifier of its own to enable the particular terminal to be identified. Before the terminal is put to use in a wireless network, the identifier of the terminal should be entered into the wireless local area network. In practice, the identifier can be entered e.g. into a base transceiver station of the wireless local area network. When the wireless network knows the identifier identifying the terminal, the base transceiver station of the wireless network allows the terminal to access the network.

The known solution described above presents such a problem that it is relatively difficult to register a new terminal in a wireless local area network. In practice, the problem usually is that a user does not know the identifier of his or her terminal. Neither can the user thus enter into the local area network the identifier that would enable his or her terminal to be used in the wireless local area network. The problem is particularly serious in wireless networks used in households and small companies, because technical support is not often available, at least not easily enough.

An object of the present disclosure is to alleviate the above-described problem and to provide a solution to improve the user-friendliness of wireless local area networks, and particularly to make a new terminal easier to connect to a wireless local area network. This object is achieved by an exemplary embodiment for connecting a terminal to a wireless local area network. The exemplary embodiment is characterized by arranging said terminal to transmit a connect message comprising an identifier to identify the terminal, retrieving, through a user interface, information on terminals which have tried to access the local area network, i.e. terminals that have transmitted a connect message, selecting, through the user interface, said terminal to be connected to the local area network from among the terminals that have tried to access the local area network, and entering, through the user interface, a control command as a result of which the local area network allows the terminal selected through said user interface to access the local area network.

An exemplary embodiment also relates to a wireless local area network comprising: a base transceiver station comprising means for transmitting signals over a wireless connection to one or more terminals connected to the local area network, and means for receiving signals over a wireless connection from one or more terminals connected to the local area network, and a user interface to enable a user to transmit a control command to the local area network in order for the local area network to allow a new terminal to be connected to the local area network. An exemplary embodiment is characterized in that said new terminal is arranged to transmit a connect message comprising an identifier to identify the new terminal to the local area network when said new terminal tries to access said wireless network, the local area network is arranged to transmit information on one or more new terminals trying to access said wireless network to the user through said user interface, and the local area network is arranged to provide access to the network for the terminal(s) the information on which has been transmitted to the user through the user interface and for which the user has given said control command through the user interface.

An exemplary embodiment also relates to a base transceiver station of a wireless local area network, the base transceiver station comprising means for transmitting signals over a wireless connection to one or more terminals connected to the local area network, and means for receiving signals over a wireless connection from one or more terminals connected to the local area network. The base transceiver station of the exemplary embodiment is characterized in that the base transceiver station comprises means for transmitting information on one or more new terminals which have tried to access said wireless network to a user interface, and the base transceiver station is arranged to provide access to the network for the terminal(s) the information on which has been transmitted to said user interface by the base transceiver station and for which the base transceiver station has received a control command through the user interface in order to connect the terminals(s) to the wireless network.

An exemplary embodiment also relates to a terminal of a wireless local area network, the terminal comprising means for transmitting signals over a wireless connection to a base transceiver station of the local area network, and means for receiving signals over a wireless connection from the base transceiver station of the wireless local area network. The terminal of the exemplary embodiment is characterized in that the terminal is arranged to transmit a connect message comprising an identifier to identify the terminal to the base transceiver station when said terminal tries to access said wireless network.

An exemplary embodiment is based on the idea that the user-friendliness of a wireless local area network is considerably improved when a new terminal to be connected to the network is arranged to transmit its identifier to the wireless network, whereafter, through a user interface of the wireless local area network, the new terminal on which information is transmitted to the user by the user interface is simply accepted into use by the user. The user does thus not need to know the identifier of the terminal to be connected to the wireless local area network but the identifier is automatically transmitted from the terminal to the wireless local area network. The user, through the user interface, only needs to accept the new terminal to be connected to the network.

In accordance with the exemplary embodiment, information e.g. on the terminals that have tried to access the wireless network during the last minute can be transmitted to the user through the user interface. The user can thus be sure that e.g. the terminal that he or she has just switched on in order to connect the particular terminal to the wireless local area network is the particular terminal the information on which is transmitted to the user by the user interface.

The most important advantage of the solution of the exemplary embodiment is thus improved user-friendliness. Furthermore, the user, through the user interface of the local area network, is enabled to monitor whether an outside terminal repeatedly tries to access his or her local area network. This is achieved by providing the wireless local area network with a memory to store long-term information on the terminals that have tried to access the wireless local area network.

Preferred embodiments of the wireless local area network, base transceiver station and terminal are disclosed.

Figure 2:
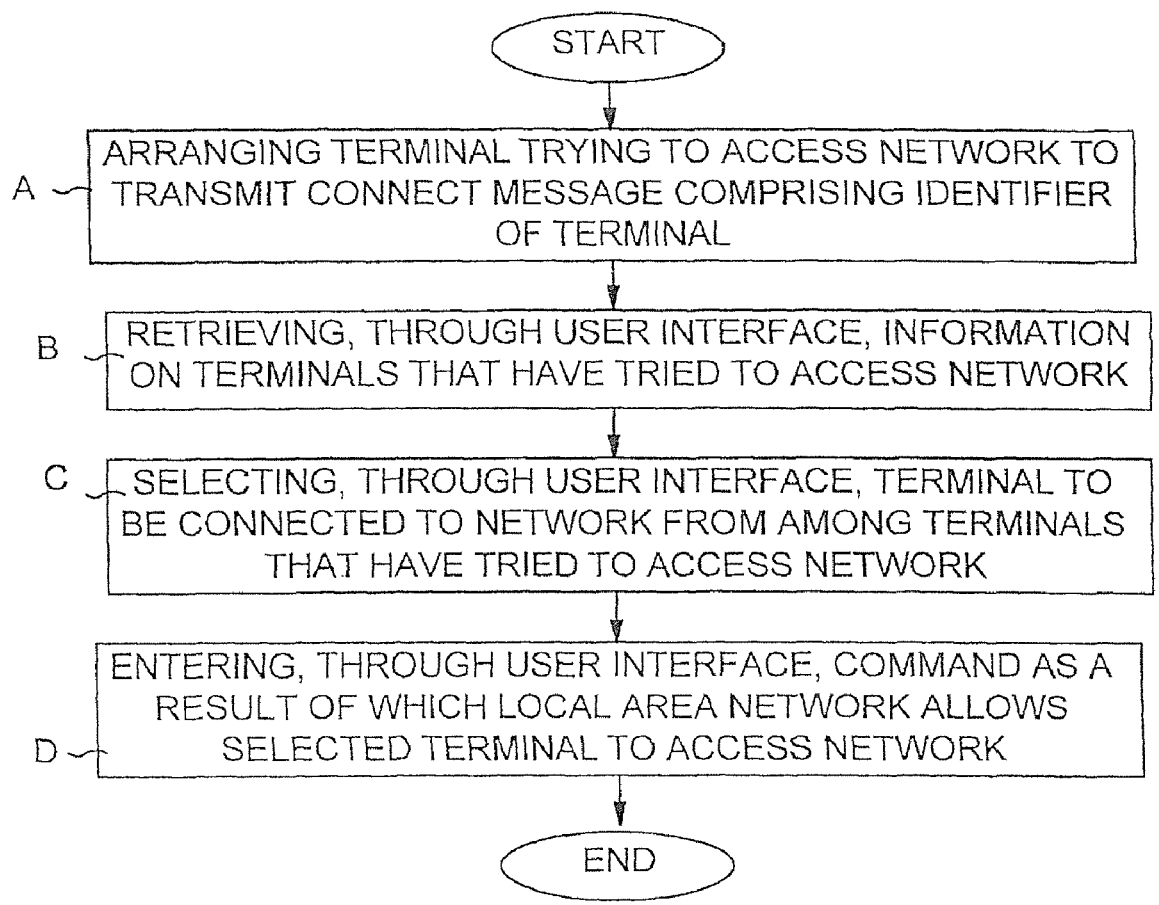

In the following, the exemplary embodiments will be described in closer detail by way of example and with reference to the accompanying drawings, in which FIG. 1 is a block diagram showing a first exemplary embodiment of a wireless network, and FIG. 2 is a flow diagram showing a first exemplary embodiment of a method for use in a wireless network.

FIG. 1 is a block diagram showing a first exemplary embodiment of a wireless network. In the case of FIG. 1, a base transceiver station 1 serves as an access point of the local area network. In the exemplary case of FIG. 1, the base transceiver station 1 is connected to a more extensive telecommunication network, e.g. to the Internet, through an asymmetric data subscriber line ADSL interface.

The wireless local area network of FIG. 1 has been provided with two terminals, i.e. a portable microcomputer 2 and a desktop microcomputer 3, connected thereto. Using radio signals, the terminals communicate with the base transceiver station 1, which means that through the base transceiver station they are able to communicate e.g. with each other or, alternatively, they can be connected e.g. to the Internet through the ADSL interface of the base transceiver station. The microcomputers 2 and 3 can be prior art microcomputers having wireless local area network WLAN cards known per se installed therein. The WLAN cards are provided with the necessary radio equipment to enable the microcomputers, using radio signals, to communicate with the base transceiver station. In the WLAN network of FIG. 1, communication may take place e.g. within a frequency range of 2.4 GHz.

Although in the case of FIG. 1 both terminals connected to the wireless local area network are microcomputers, any device for which a telecommunication connection is to be set up can be connected to the wireless network. The terminals can thus comprise e.g. an output unit, wireless telephone or a home electronics device, such as a television, radio or even a washing machine, if a need exists to set up a telecommunication connection to such a device.

The wireless local area network of FIG. 1 also comprises a user interface 4 to enable the wireless local area network to be controlled. In the exemplary case of FIG. 1, a terminal connected to the base transceiver station 1 constitutes the user interface. The user interface can, however, be implemented in another way, e.g. by integrating it into the base transceiver station 1. The base transceiver station can then comprise a display and a keypad to enable the user to control the local area network.

In the case of FIG. 1, the user interface can be integrated such that the base transceiver station maintains world wide web WWW pages onto which it produces information on the local area network. The terminal serving as the user interface 4 then employs browser software to enable a person maintaining the local area network to access the WWW pages of the base transceiver station in order to read and enter information. According to an exemplary embodiment, a piece of the information produced onto the WWW pages of the base transceiver station is a list of such terminals which have tried to access the wireless local area network e.g. during the last minute. The user can thus see the list of the terminals that have tried to access the network from the display of the user interface 4, in which case the user can through his or her terminal give a control command to the base transceiver station e.g. to connect a particular terminal to the wireless local area network. The process of connecting a new terminal to the local area network of FIG. 1 will be described in closer detail by means of the flow diagram of FIG. 2.

FIG. 2 is a flow diagram showing a first exemplary embodiment of a method for use in a wireless network. The flow diagram of FIG. 2 can be utilized e.g. for connecting a new terminal to the wireless local area network shown in FIG. 1. In the following description, it will be assumed that a terminal 3 is being connected to the wireless local area network of FIG. 1, the use of the particular terminal in the local area network having earlier been prevented by the base transceiver station 1 because the terminal has not been previously registered in the local area network of FIG. 1.

In block A, the terminal 3 trying to access the network is arranged to transmit a connect message provided with an identifier of the terminal. Prior to this, the terminal 3 has either automatically examined the available channels until it has found the traffic channel used by the base transceiver station (the network name determined for the terminal being displayed on the traffic channel) or the correct traffic channel has been supplied to the terminal, in which case the terminal does not need to carry out a search. In block A, the terminal 3 is arranged to transmit such a connect message that the local area network (the base transceiver station in the case of FIG. 1) will understand that the terminal is a new terminal which tries to access the local area network maintained by the base transceiver station. The identifier transmitted in the connect message by the terminal 3 comprises a unique, terminal-specific identifier to enable the terminal to be distinguished from other terminals. An alternative is to use a medium access control MAC address of the terminal.

In block B, information on the terminal that tried to access the network is retrieved through the user interface 4. In the case of FIG. 1, this information is stored in the memory of the base transceiver 1, from which it is retrieved by means of the user interface 4, i.e. the terminal. According to an exemplary embodiment, the display of the user interface then shows a list of the identifiers of the terminals that have tried to access the network. The times at which the terminal having the particular identifier has tried to access the network can be shown in connection with the identifiers. Alternatively, the display of the user interface may show a list of the identifiers of only the terminals that have tried to access the network e.g. during the last minute. The user can thus be relatively sure that the identifier shown on the display of the user interface is the identifier of the terminal 3 which he or she is adding to the wireless network.

In block C, the terminal 3 to be connected to the network is selected through the user interface from among the devices that have tried to access the wireless network, and in block D, through the user interface, a control command is entered as a result of which the local area network, i.e. in practice the base transceiver station 1 in the case of FIG. 1, allows the selected device(s) to access the network. Depending on the implementation, the procedures of blocks C and D can be carried out in one or more stages, e.g. such that the terminal(s) that is/are to be connected to the network is/are selected from the user interface by means of the graphic user interface 4, after which a control command is given e.g. by pressing the ENTER key to accept the selected terminals to be added to the network.

In accordance with an exemplary embodiment, the user interface enables the user, through the user interface, to enter a "cleartext name" (e.g. "the study computer") for the new terminal connected to the network. If desired, through the user interface, the user is thus capable of viewing the list of the terminals that are allowed to be used in the network, the list being located in the memory of the base transceiver station 1. The cleartext names selected by the user himself or herself thus enable as user-friendly a presentation of the allowed devices as possible. If the user later wishes to remove a single device, this can also be carried out through the graphic user interface e.g. such that the user, using the list produced by the user interface, selects the terminal he or she wishes to remove. Since the names given by the user to the terminals are shown, different devices are easy to identify through the user interface.

It is to be understood that the above description and the related figures are only intended to illustrate the present invention. It is obvious to one skilled in the art that the invention can be varied and modified in many ways without deviating from the scope and spirit of the invention disclosed in the claims.

The invention claimed is:

1. A method for connecting a terminal to a wireless network, the method comprising:
    receiving a plurality of connection request messages from a plurality of terminals over a wireless connection, each of the plurality of connection request messages comprising an identifier;
    providing a list to an interface, the list identifying each of the plurality of terminals from which at least one connection request message has been received during a most recent predetermined period of time;
    receiving a control command from the interface, the control command representing a selection of a particular terminal from the list to be connected to the wireless network; and
    connecting the particular terminal to the wireless network.

2. The method of claim 1, wherein the identifier for each of the plurality of terminals comprises a Medium Access Control (MAC) address assigned to the terminal.

3. The method of claim 1, wherein the list identifies a plurality of connection requests for one of the plurality of terminals and a time associated with each of the identified connection requests.

4. The method of claim 1, wherein providing the list to the interface comprises displaying the list on a display of a network control terminal connected to the wireless network.

5. The method of claim 4, wherein the list associates a time at which a terminal attempted to access the wireless network with the identifier of that terminal.

6. The method of claim 1, further comprising, associating the identifier of each terminal with a cleartext name selected via the interface, wherein the list associates the cleartext name with the identifier of the one or more terminals that attempted to access the wireless network.

7. A base transceiver station of a wireless network, the base transceiver station comprising:
    means for receiving a plurality of connection request messages from a corresponding plurality of terminals over a wireless connection, each of the plurality of connection request messages comprising an identifier and a request to connect to the wireless network;
    means for transmitting signals over the wireless connection to the plurality of terminals;
    means for transmitting, to an interface, information about en one or more of the plurality of terminals that have attempted to access the wireless network during a most recent predetermined period of time,
    wherein the base transceiver station is configured to allow at least one of the plurality of terminals access to the wireless network when the base transceiver station receives a control command through the interface, the control command representing a selection of at least one of the plurality of terminals.

8. The base transceiver station of claim 7, wherein the identifier comprises a Medium Access Control (MAC) address assigned to the terminal.

9. The base transceiver station of claim 7, wherein the interface is provided on a separate terminal connected to the wireless network.

10. The base transceiver station of claim 7, wherein the interface is integrated with the base transceiver station.

11. The base transceiver station of claim 7, wherein the information transmitted to the interface further identifies a plurality of connection request messages for a same terminal and a time associated with each of the identified connection request messages.

12. A method for managing access to a wireless network via a base transceiver, the method comprising:
    receiving, at the base transceiver, a plurality of connection requests from a plurality of terminals, each connection request including a unique identifier associated with a corresponding terminal;
    storing a list that identifies the connection requests from terminals that have attempted to access the wireless network during a most recent predetermined period of time;
    providing the list to an control interface, the interface configured to display the list and to allow selection of a terminal from the list;
    receiving, from the interface, a selection of a terminal from the list; and
    allowing the selected terminal to access the wireless network.

13. The method of claim 12, wherein the unique identifier for each terminal comprises a Medium Access Control (MAC) address assigned to the terminal.

14. The method of claim 12, wherein the list identifies the connection requests using the unique identifiers for the terminals associated with the connection requests.

15. The method of claim 12, wherein the interface is displayed on an external computing system connected to the base transceiver via the wireless network.

16. The method of claim 12, wherein the list associates the unique identifier with a time of the connection request for a respective terminal.

17. The method of claim 16, wherein the unique identifier for each terminal comprises a cleartext name for the terminal, and the n interface associates the cleartext name with the terminal associated with the connection request.

18. A base station for managing access to a wireless network, the base station comprising:
    a transceiver configured to wirelessly transmit signals to and wirelessly receive signals from a plurality of terminals;
    a first circuit connected to the transceiver and configured to receive connection requests transmitted to the wireless network from at least one of the plurality of terminals and configured to log unique identifiers for each of the plurality of terminals associated with the connection requests;

a storage medium connected to the circuit and configured to store a list of the logged unique identifiers for each of the plurality of terminals;

a second circuit connected to the storage medium and configured to:

communicate the list of the logged unique identifiers for each of the plurality of terminals to an external interface for displaying signals indicative of each of the terminals corresponding to the logged unique identifiers to a user, wherein the list indicates terminals that have attempted to access the wireless network during a most recent predetermined period of time; and receive a control selection of a terminal associated with a connection request; and a third circuit configured to allow access to the network by the terminal indicated in the control selection.

19. The base station of claim 18, wherein logging the unique identifiers of the terminals comprises storing a list of identifiers associated with the plurality of terminals from which a connection request is received.

20. The base station of claim 18, further comprising:

a fourth circuit configured to create one or more web pages viewable by a browser software application, the one or more web pages allowing a user to select a terminal associated with one or more failed connection attempts.

* * * * *